(12) United States Patent  
Lavan

(10) Patent No.: US 7,306,187 B2
(45) Date of Patent: Dec. 11, 2007

(54) INFLATABLE ENDURANCE UNMANNED AERIAL VEHICLE

(75) Inventor: Charles K. Lavan, Medina, OH (US)

(73) Assignee: Lockheed Martin Corporation, Akron, OH (US)

( * ) Notice: Subject to any disclaimer, the term of this patent is extended or adjusted under 35 U.S.C. 154(b) by 291 days.

(21) Appl. No.: 11/131,556

(22) Filed: May 17, 2005

(65) Prior Publication Data

US 2006/0261213 A1 Nov. 23, 2006

(51) Int. Cl.
*B64C 3/46* (2006.01)

(52) U.S. Cl. .................... 244/123.11; 244/49

(58) Field of Classification Search ............ 244/158.3, 244/159.5, 172.6, 123.11, 46, 49, 5, 25, 30, 244/146; 446/34, 225, 61
See application file for complete search history.

(56) References Cited

U.S. PATENT DOCUMENTS 3,463,420 A * 8/1969 Carter et al. ................ 244/46

3,507,150 A * 4/1970 Stengel .................... 73/170.16
5,518,205 A 5/1996 Wurst et al. ................. 244/58

FOREIGN PATENT DOCUMENTS

JP 05338592 A * 12/1993 ................ 244/32

* cited by examiner

*Primary Examiner*—Timothy D. Collins
(74) *Attorney, Agent, or Firm*—Renner Kenner Greive Bobak Taylor & Weber

(57) ABSTRACT

An inflatable endurance unmanned vehicle includes an inflatable hull with at least one inflatable wing extending therefrom. The inflatable wing has at least one spar movable between an extended position and a retracted position. Photovoltaic arrays are used to power the vehicle during daytime operation and power an electrolyzer. A fuel cell powers the vehicle during nighttime operation.

18 Claims, 5 Drawing Sheets

INFLATABLE ENDURANCE UNMANNED AERIAL VEHICLE

TECHNICAL FIELD

The present invention relates generally to inflatable endurance unmanned vehicles. In particular, the present invention is directed to an inflatable endurance vehicle with a dual power system. Specifically, the present invention is directed to an inflatable endurance vehicle that utilizes the power system to operate in both nighttime and daytime environments for extended periods of time.

BACKGROUND ART

Use of airborne vehicles for military surveillance and communication platforms is well known in the art. Lighter-than-air balloons were initially used to observe enemy forces to obtain battlefield intelligence. Aerostats of today perform essentially the same function and may also facilitate communications between distant forces by relaying information utilizing the aerostat as a communications platform. AWACS (Airborne Warning and Control System) planes can perform some of the same functions.

The use of aerostats is problematic inasmuch as they are usually tethered to a ground location and for the most part are stationary. In other words, aerostats are not easily moved from one location to another once they are deployed. It is also difficult to position, deploy and retrieve aerostats in inclement weather. And known self-powered aerostats must be retrieved for re-fueling. Accordingly, any communications link provided by such an aerostat is unavailable during re-fueling. Airplanes that provide communication platforms can move about, but they must be continually refueled and as such cannot stay aloft for extended periods of time. Airplanes are also somewhat limited in the altitude that they can reach to facilitate long range communications. And due to lack of fly-over rights and needed regional support facilities, some areas may not be conducive to use of airplanes with communications equipment.

Therefore, there is a need in the art for an unmanned aerial vehicle that is easily deployed and that can stay aloft at high altitudes for extended periods of time. There is also a need for such a vehicle that is retrievable and that can be re-deployed after minimal servicing.

BRIEF DESCRIPTION OF THE DRAWINGS

For a complete understanding of the objects, techniques and structure of the invention, reference should be made to the following detailed description and accompanying drawings, wherein.

SUMMARY OF THE INVENTION

In light of the foregoing, it is a first aspect of the present invention to provide an inflatable endurance unmanned aerial vehicle.

It is another aspect of the present invention to provide an inflatable endurance vehicle comprising an inflatable hull; at lease one inflatable wing extending from the inflatable hull, wherein the inflatable wing has at least one spar movable between an extended position and a retracted position.

BEST MODE FOR CARRYING OUT THE INVENTION

Figure 1:
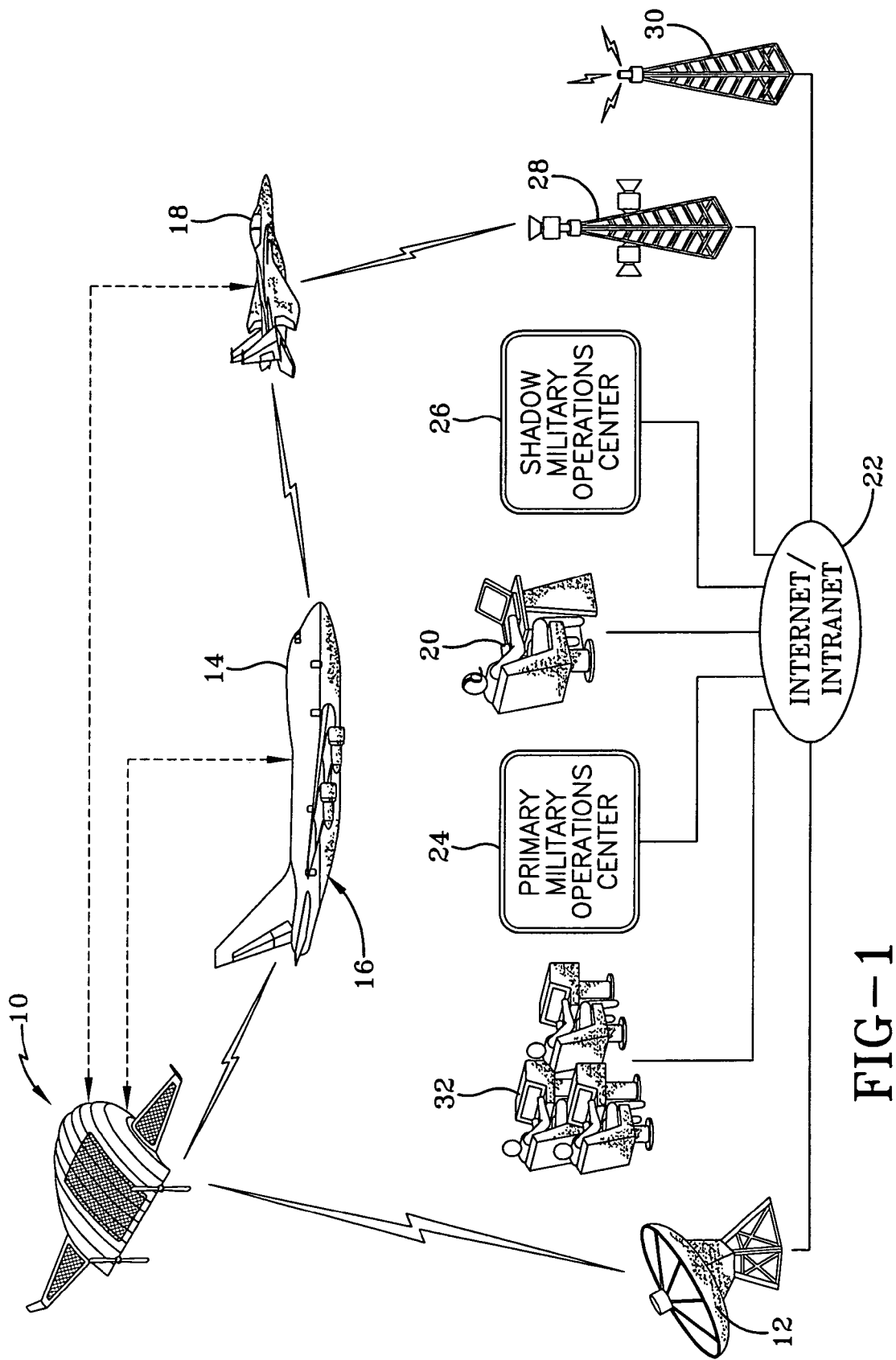
FIG. 1 is a schematic diagram of a deployment scenario for an inflatable endurance unmanned aerial vehicle made in accordance with the concepts of the present invention.

Referring now to the drawings and in particular to FIG. 1 it can be seen that an inflatable endurance unmanned air vehicle is designated generally by the numeral 10. As will be discussed in further detail, the vehicle 10 is a hybrid air vehicle that combines buoyant lift with aerodynamic lift and is capable of operating at altitudes up to 70,000 feet. The vehicle is a recoverable asset inasmuch as it can be retrieved after completion of a mission and re-fitted for re-use. The vehicle 10, once deployed, can be moved to and from various locations by remote command so as to move with a battle group or fleet of ships. The vehicle 10 and associated systems facilitate connectivity and decision making by forces deploying the vehicle as a communications platform. As shown in FIG. 1, the vehicle 10 may be associated with a satellite communication station 12 or a control aircraft 14 which could also be a naval vessel or other movable device, wherein the aircraft 14 carries a virtual military operations control terminal 16. The vehicle 10 may also be in communication with a fighter aircraft 18 or other discrete fighting units. In one exemplary scenario, an air traffic controller 20 is associated with or has access to an internet/intranet 22 that is also connected to the satellite communication system 12. Such communication abilities may be used by primary and shadow military operation centers 24 and 26. It will also be appreciated that cell phone towers 28 and other communication towers 30 may be linked to the internet and other system components as shown to provide for the transfer of voice, data, video and other related electronic information. Of course, any number of wireless communication protocols could be used as they become available. All of these communications are facilitated by components carried by the vehicle 10.

Figure 2:
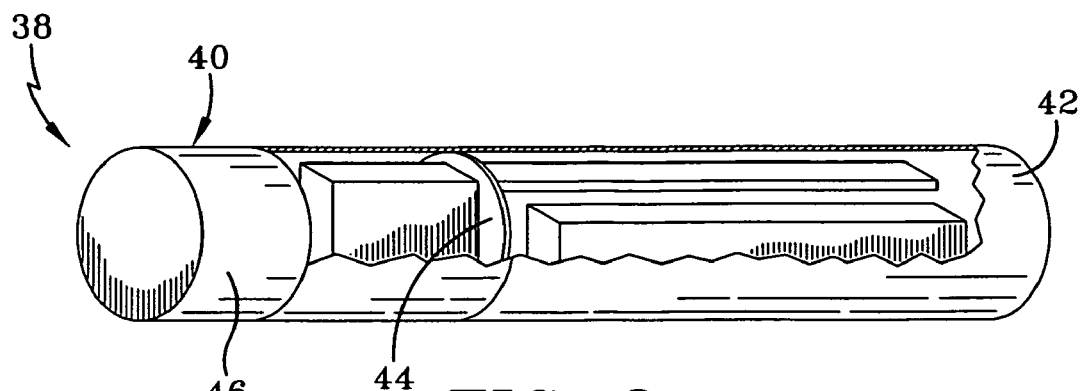
FIG. 2 is a schematic cut-away view of a container which holds the vehicle prior to deployment.
Figure 3:
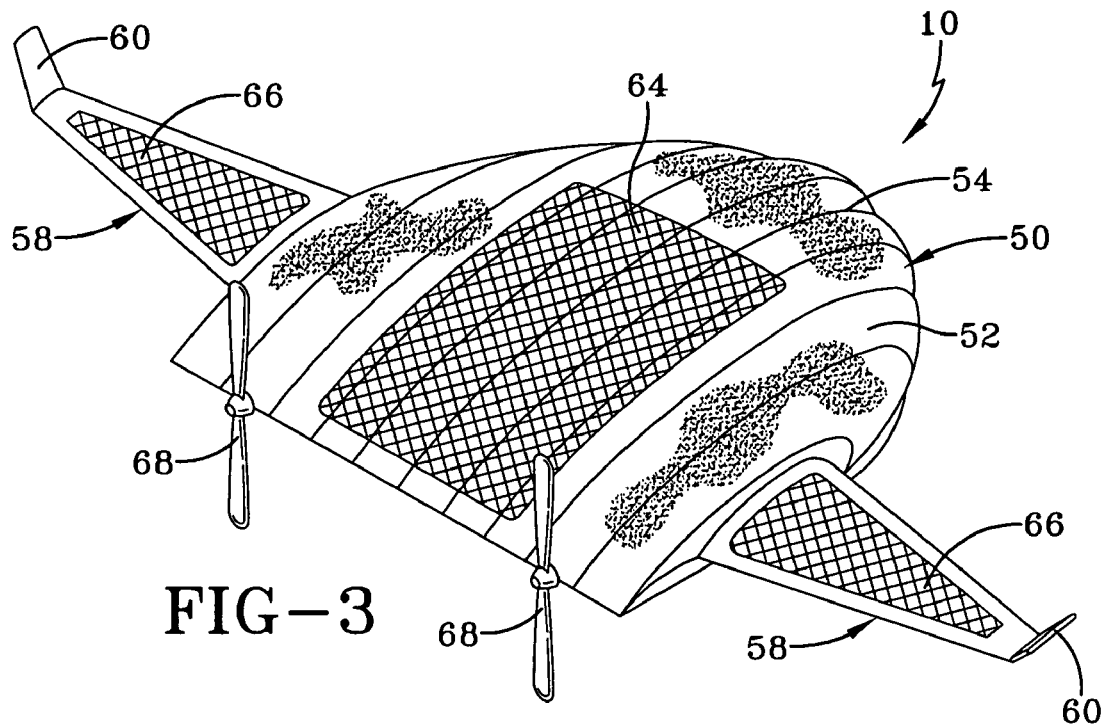
FIG. 3 is a top perspective view of the vehicle.
Figure 4:
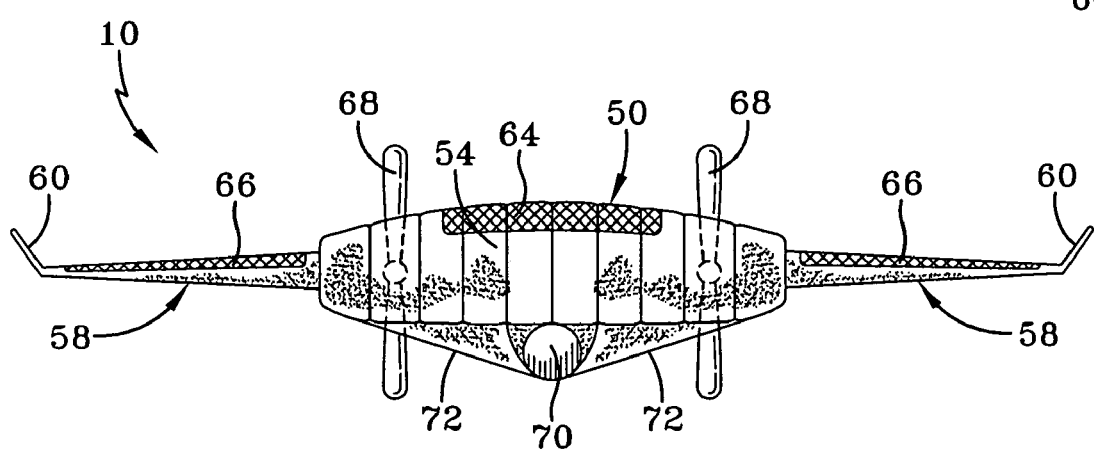
FIG. 4 is an elevational view of the vehicle.

One mode for deploying the vehicle 10 is shown in FIG. 2 wherein a torpedo round or casing is designated generally by the numeral 38. The casing 38 is sized to be carried by submarines so that it may be stored therein and deployed as needed. It will also be appreciated that the casing 38 may simply be carried by a naval vessel or aircraft and launched accordingly. The casing 38 includes a shell 40 which may be opened with exploding bolts or other similar means. The shell 40 includes a vehicle chamber 42 which carries the vehicle 10, and a payload chamber 44 which carries communications systems and power systems for the vehicle 10. Finally, the shell 40 includes an inflation chamber 46 which carries gas utilized to inflate the vehicle 10 at deployment. It will be appreciated that the shell 40 may carry the necessary hardware and software for deploying the vehicle 10 once the casing has been opened by whatever means. The control mechanism for inflating the vehicle may be maintained in either the vehicle chamber 42 or the payload chamber 44. Indeed, the inflation control mechanism may even be carried by the vehicle itself.

Figure 5:
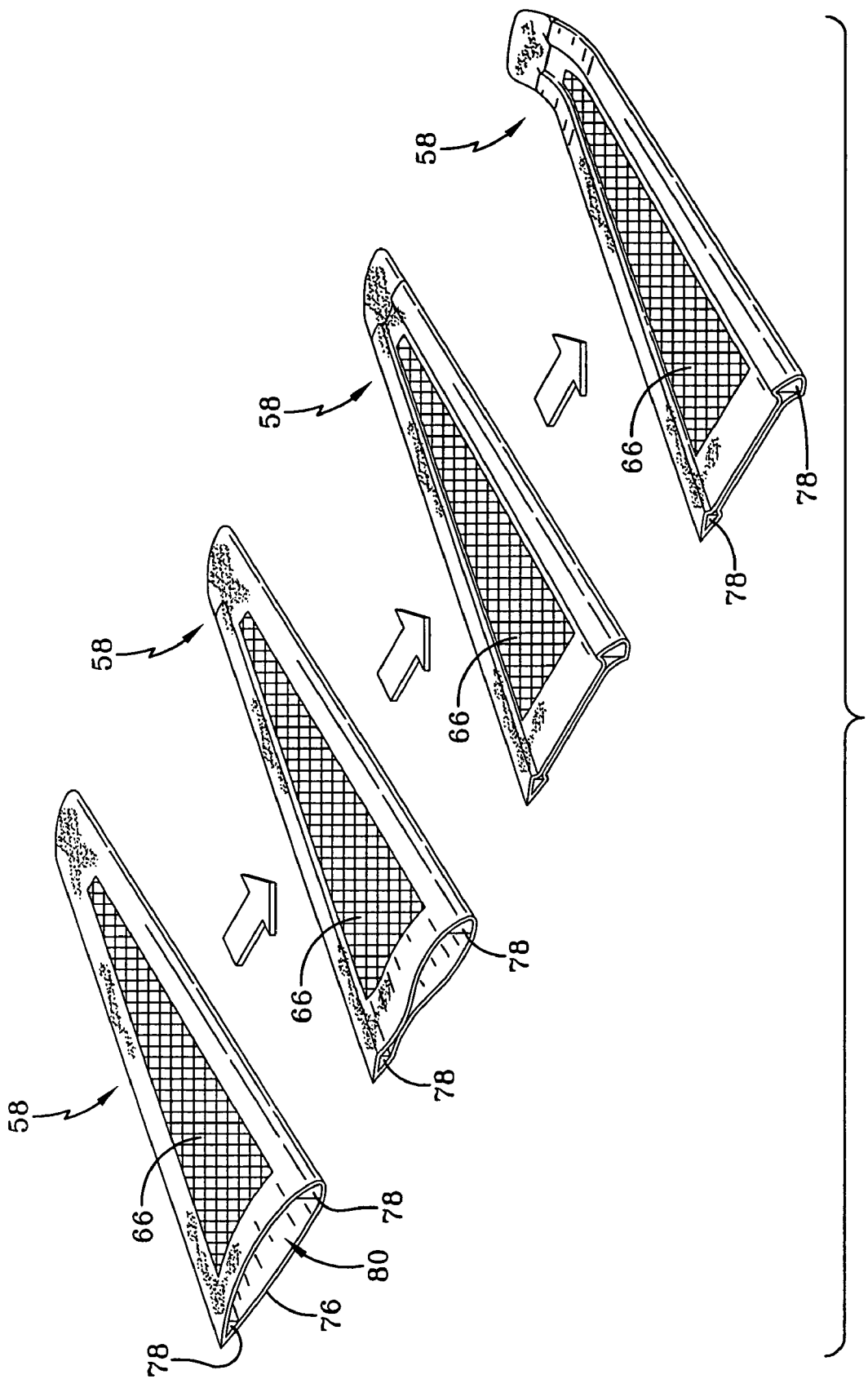
FIG. 5 is a perspective view of the deployment stages of a wing utilized by the vehicle in accordance with the concepts of the present invention.
Figure 6:
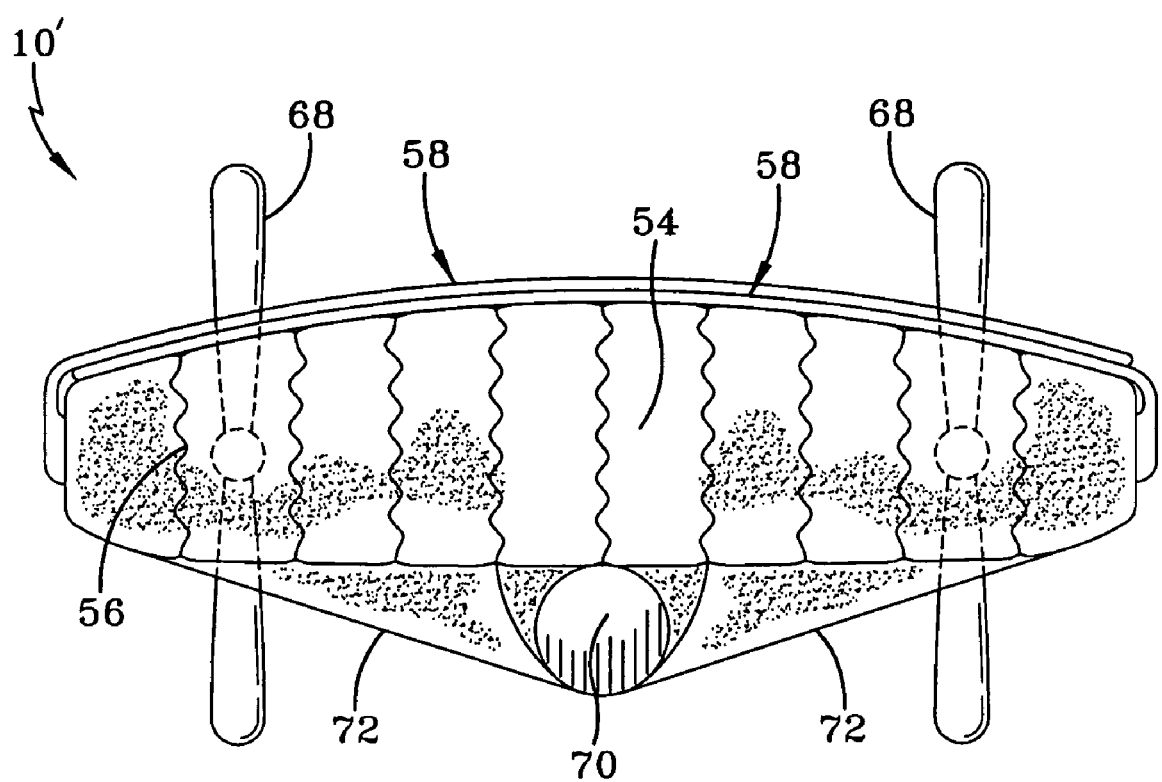
FIG. 6 is a cross-sectional view of the vehicle showing the wings of the vehicle in a retracted position.

Referring now to FIGS. 3-6 it can be seen that the vehicle 10 includes a hull 50 which is configured in an elastica structure. The hull 50 is constructed of a fabric material 52 such as described in U.S. patent application Ser. No. 10/388,772 (Published Application No. 2004/0180161 A1, published Sep. 16, 2004) which is incorporated herein by reference. The fabric material 52 is supported by a plurality of lengthwise tendons 54 which are connected by internal curtains 56 as best seen in FIG. 6. Use of the tendons 54 and the curtains 56 allow for a lighter fabric material to be used while still providing the adequate strength to lift the payload to a desired altitude. A pair of wings 58 extend from the hull 50. It will be appreciated that the hull 50 and wings 58 are hollow in construction to allow for pressurization utilizing a lighter-than-air gas such as helium. As will be discussed in detail later, the wings may be constructed with a shape memory polymer material with memory properties so as to allow for the folding or retraction of the wings during nighttime operation. In any event, the wings 58 may be provided with a tip to provide aerodynamic stability. And it will be appreciated that the vehicle may be provided with only one wing, or more than two wings depending upon a desired aerodynamic effect.

A hull photovoltaic array 64 may be disposed on all or selected portions of the hull 50. Likewise, the wings 58 may also have disposed thereon a wing photovoltaic array 66 on both upper and lower surfaces. Both photovoltaic arrays 64 and 66 may be electrically linked to one another in such a way as to provide power to the vehicle 10 in a manner which will be described in detail.

A pair or propellers 68 are mounted to the aft portion of the hull 50 and are of a push type to assist in the flight and steering control of the vehicle 10. The hull 50 carries a payload/equipment housing 70 which was initially carried in the payload chamber 44 of the shell 40. Upon inflation of the vehicle 10, the housing 70 is carried by at least one cable 72 that is wrapped around the hull 50 in an aerodynamic and efficient manner.

During daytime operation of the vehicle, the wings 58 are extended and deployed so as to allow for energization of the vehicle by use of the photovoltaic arrays. During nighttime operation, when the photovoltaic arrays no longer are efficiently collecting sunlight, the wings are folded or retracted so as to improve the lift and flight properties of the vehicle. In order to accomplish this the wings 58 are constructed in such a manner so as to allow for their retraction into or around the hull of the vehicle 10. As best seen in FIG. 5, the wings 58 include a fabric material 76 which is usually the same as the fabric material 52. The fabric material 76 covers a pair of spaced apart spars 78 which form leading and trailing edges of each wing 58. The fabric material 76 and the spars 78 form a cavity 80 which fills with the lighter-than-air material contained within the hull. Systems within the hull allow for pressurization and depressurization—inflation/deflation—depending upon night and day characteristics.

When the vehicle is first deployed, the spars are configured into their nighttime shape which is where the wings are folded over the hull of the vehicle 10' as seen in FIG. 6. The shape memory polymer is selected to have a transition temperature range that correlates with exposure to sunlight. Accordingly, as the spars are heated by solar radiation to a predetermined transition temperature the shape memory polymer provides a sufficient torque to unroll the wings to an extended position, as shown in FIG. 5, and are pressurized by an internal pressure regulator that fills the wings with the lighter-than-air gas to a deployed wing condition. During daytime operation, the temperature of the wings remains above the transition temperature and the wings remain deployed due to the combined action of the temperature and the internal pressure increase. When nighttime operation commences, somewhat simultaneously, the wing is depressurized and the spars are cooled back through the transition temperature to a lower, non-transition temperature and the deflated wing returns to a folded-over position as seen in FIG. 6. In the alternative, the hull 50 may include a wing well for each respective wing. In this alternative, the memory shape of the wing is a coil configuration that is received in the wing well. Internal heating elements may be used to raise the temperature of the spars to the transition temperature such that when the wings are fully coiled, the vehicle is in a nighttime configuration designated by the numeral 10' in FIG. 6. The vehicle 10' has a reduced aerodynamic profile and functions more like an aerostat in this configuration.

Figure 7:
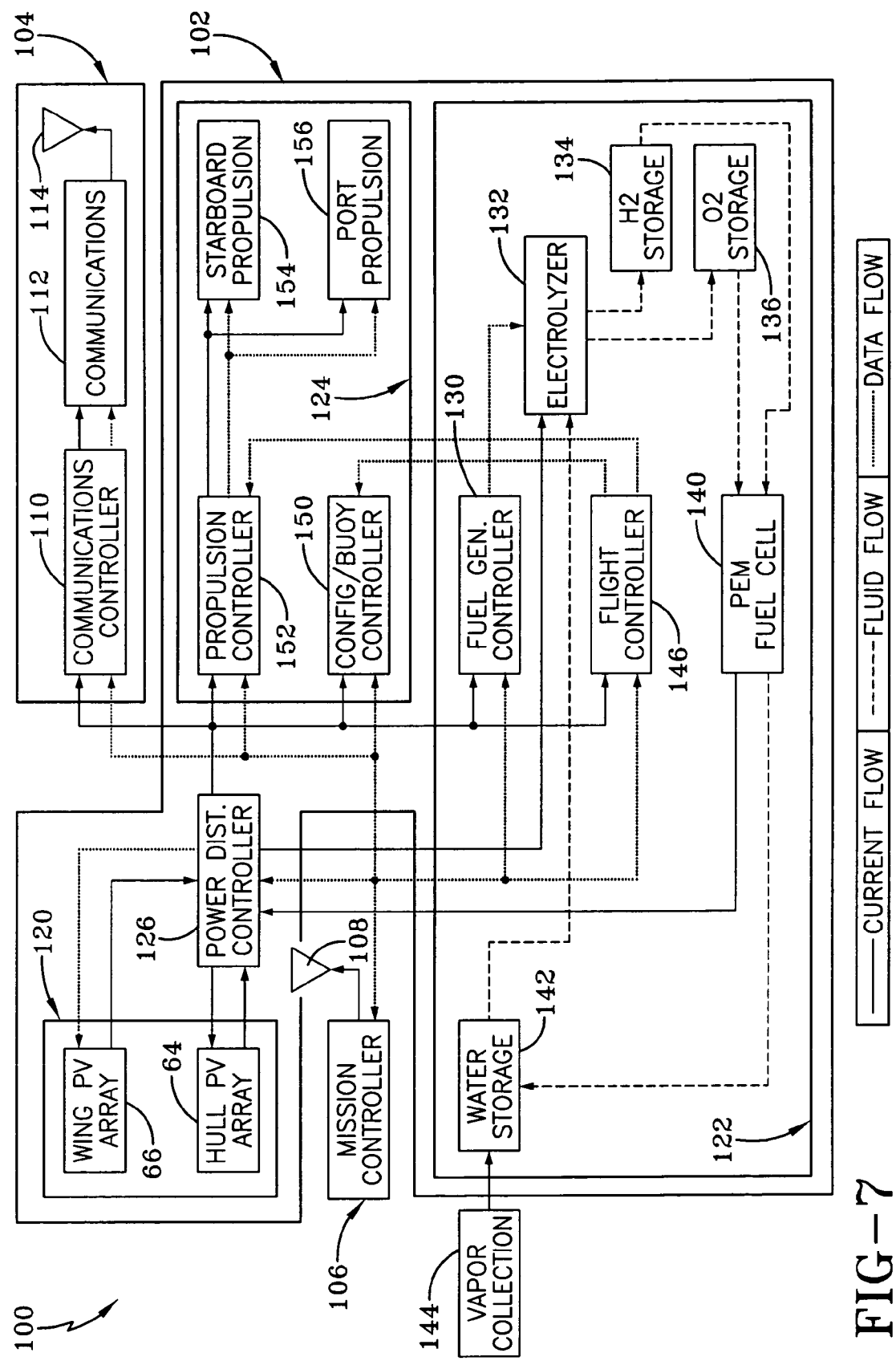
FIG. 7 is a system diagram showing a dual power system along with related communication components made in accordance with the concepts of the present invention and carried by the vehicle.

Referring now to FIG. 7 it can be seen that a payload system is designated generally by the numeral 100. The payload system 100 is carried in the housing 70 and facilitates operation of the vehicle 10 and also functions as the communications platform as shown and discussed in FIG. 1. Prior to discussing the details of FIG. 7 it will be appreciated that interconnections of the various components within the payload system include a solid line which represents current flow; a dashed line which represents fluid flow; and a dotted line which represents data flow. Generally, the payload system 100 includes a power system 102, a communications system 104, and a mission controller 106 which is connected to a mission controller antenna 108.

The mission controller 106 is a micro-processor based device which includes the necessary hardware, software and memory for initiating operations of the payload system and for communicating flight instructions between the vehicle 10 and a ground-based or other platform based control device. In other words, the operational status of the vehicle 10 is controlled via communication signals received by the antenna 108 and implemented by the mission controller 106. For example, commands to control the flight patterns or positioning of the vehicle 10 are received and communicated by the mission controller 106 which disseminates the appropriate command and control functions to the power system 102.

The communications system 104 includes a communications controller 110 which includes the necessary hardware, software and memory for enabling the vehicle as a communications platform. The system 104 includes fleet communications hardware 112 which implements the appropriate communications protocols and receives and sends signals via an antenna 114 in an appropriate manner. These communications protocols may include but are not limited to encrypted routers with various types of encrypted keys and the like.

The power system 102 includes an external power system 120, an internal power system 122, a propulsion system 124 and a power distribution controller 126 which links the various system 120-124 to one another. The power distribution controller 126 facilitates transfer of power between the various systems 104 and 106 and also provides the appropriate control signals for doing so. The external power system 120 includes the wing photovoltaic array 66 and the hull photovoltaic array 64 which collect solar energy for conversion into electrical energy. The external power system 120 is utilized during daytime operation and is used to provide power to the propulsion system 124.

The internal power system 122 includes a fuel generation controller 130 which includes the necessary hardware, software and memory for controlling various aspects of the internal power system. The internal power system includes an electrolyzer 132 which separates water into hydrogen and oxygen components which are stored in respective storage receptacles 134 and 136. These components are then delivered to a proton exchange membrane (PEM) fuel cell 140. Electricity generated by the fuel cell 140 is transferred to the power distribution controller while the waste product or water generated by the fuel cell is transferred to a water storage container 142. A vapor collector 144 is associated with the water storage device for the purpose of collecting water vapor as the vehicle is in flight. The vapor collector 144 supplements the initial amount of water contained in the water storage container. Any water lost during operation of the electrolyzer and/or the fuel cell is replaced by the collector 144. During nighttime operation, the vehicle may be operated at a reduced altitude so as to enhance collection of water vapor.

The internal power system is primarily used in nighttime operations such that any water contained within the water storage device, that is either collected by the vapor collector 144 or recycled from the fuel cell 140, is delivered to the electrolyzer 132 which is operationally controlled by the fuel generation controller 130. The electrolyzer 132 separates the water into hydrogen and oxygen components which are then delivered to the fuel cell 140 for generation of power as previously discussed. The electrolyzer 132 functions during daylight hours with power generated by the photovoltaic arrays and $H_2/O_2$ is stored for nighttime use.

The flight controller 146, which may be a part of the external power system or a separate component, contains the necessary hardware, software and memory for maintaining a proper flight path according to whether the device is operating in a nighttime or daytime condition. The flight controller 146 receives power from the power distribution controller 126 and command signals from at least the mission controller 106. In response, the flight controller generates corresponding command signals received by the propulsion system 124.

The propulsion system 124 includes a configuration/buoyancy controller 150 that transitions between the daytime and nighttime operations of the vehicle. In other words, the controller 150 includes the necessary hardware, software and memory to inflate and deflate the extendable wings, deploy and retract the wings as needed, and to switch between the internal and the external power systems as deemed appropriate. The propulsion controller 152 receives power from the power distribution controller and also information from the flight controller 146 and the mission controller 106 as needed. The propulsion controller 152 is linked to a starboard propulsion motor 154 and a port propulsion motor 156 that rotates a corresponding propeller 68. Indeed, the propellers 68 control the positional location of the vehicle as instructed by the mission controller 106 and/or the flight controller 146. The propulsion controller 152 transfers current from the power distribution controller 126 that is generated by either the arrays 64/66 and/or the fuel cell 140 to the motors as needed while also providing the needed control information.

The vehicle 10 is scalable to different payload, power and speed requirements. The vehicle 10 can not necessarily be considered a lighter-than-air vehicle inasmuch as it depends on both static (buoyant) and dynamic lift to stay aloft. Accordingly, the vehicle is considered to be an aero-dynamic hybrid. The vehicle provides sufficient buoyant lift to offset most (if not all) of the vehicle weight using dynamic lift to satisfy the payload lift requirement. It is believed that the vehicle can operate up to 21 kilometer altitude and support fleet communication requirements of a 600 km radius at that altitude. Reduced communications radiuses of 510 km can be obtained at 15 km altitude during nighttime operations. It is believed that such a vehicle can operate aloft for up to 30 days and possibly longer.

The vehicle 10, without wings deployed for nighttime operation, must sustain its own weight and the payload weight at an altitude within the region of 15 km to 21 km altitude. The vehicle 10, with wings deployed during daytime operations must sustain itself at an altitude of up to 21 km and use the added power from the photovoltaic arrays to operate the internal power system or fuel cell during the nighttime operation sequence.

In order to achieve the lift requirements specified by these criteria it will be appreciated that the hull 50 is provided with the necessary profile and wing design to result in an optimal aerodynamic performance. Accordingly, the vehicle is able to generate sufficient power and energy for the diurnal cycle. Accordingly, the energy collected during the daylight hours by the photovoltaic arrays must sustain all vehicle and payload functions for the subsequent nighttime cycle.

When the photovoltaic arrays no longer generate the needed power, nighttime operations are initiated and the wings are retracted as previously described. In this mode, fuel cell operation is initiated and the vehicle is allowed to slowly descend to about 15 km. This allows for the vehicle to realize increased static or buoyant lift due to the increased air density at 15 km inasmuch as static lift is directly proportional to the air density. And the increased dynamic lift at 15 km due to increased air density is also realized. It will also be appreciated that recovery of water vapor for the regenerative power system is much more productive at 15 km than at 21 km. Accordingly, the water vapor is considered to be one of the, if not primary, limiting persistence parameter since the regenerative system depends on the water electrolysis reaction to generate the hydrogen and oxygen fuel for the fuel cell.

Upon completion of the nighttime cycle, the vehicle ascends to its higher operational altitude at 21 km after uncoiling and inflating the photovoltaic wings at sunrise. This initiates electrolyzer functions and generates the hydrogen and oxygen for the next diurnal cycle. The deployed wings are believed to be capable of generating a power output of greater than 6 kwe during the daytime exposure used entirely for the electrolysis function. This enables communications connectivity over the entire diurnal cycle, without altitude effect, for an entire battle group as represented in FIG. 1.

The photovoltaic arrays are likely constructed of a thin film photovoltaic such as amorphous silicon or copper indium gallium diselenide which is used to provide all daytime power such as propulsion, payload, electrolyzer, and other housekeeping functions. The electrolyzer provides hydrogen and oxygen (by dissociating the water) which is stored for the nighttime cycle. The fuel cell provides nighttime power for the propulsion, payload and housekeeping functions of the vehicle. And it will be appreciated that the electrolyzer only operates during daytime hours and only when the wing arrays are deployed. The photovoltaic arrays are highly efficient as shadowing is minimized for all of the lowest sun angles at sunrise and sunset.

Deployment of the wings is controlled by a leading/trailing edge shape memory alloy. Actuation of the wing arrays is controlled by the flight and mission controllers and triggered by the sunrise/sunset events. When the output of the arrays drop below a prescribed level, the array-wings fold over the hull or coil into the wing wells located in the hull. The folded-over or retracted wing helps to minimize skin friction and induced drag. At sunrise, generation of a predetermined output by the hull photovoltaic array triggers unfolding and re-pressurization of the wings and turning off of the fuel cell.

Yet another advantage of the present invention is that it can be configured to be maintained within a shell or torpedo casing for rapid deployment. Accordingly, the vehicle is configured in uninflated condition to be packed into a small, height-density package that can easily inflate and deploy from any surface, subsurface or air combatant vehicle. The structural concept is based on using the inflated lifting body concept with major structural load being reacted out by means of the elastica tendons. The elastica concept functions by reducing the local hoop radius of curvature of the body using elastic taped tendons, the stress on the hull fabric is reduced directly and proportional to the radius ratio. This approach allows the use of very light weight hull fabric, thereby reducing structural weight fraction and increasing the static lift capability of the vehicle. The propulsion system consists of direct drive or gear ratio reduction variable speed electric motors with 3 meter diameter propellers. 2-,3- and 5-blade propellers could be employed in the vehicle depending upon the desire for thrust generation as offset by weight of the propellers. It is believed that the motors will operate over a 0 to 1,000 rpm rotational speed range. Induction motors, switched reluctance motors or brushless DC motor types are compatible with the vehicle construction. Thrust vectoring will be achieved by differential thrust from two motors in the yaw plane. The structural interface of the propulsion motors to the aft edge of the hull is believed to provide the best operational properties.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. An inflatable endurance vehicle, comprising:
   an inflatable hull; and
   at least one inflatable wing extending from said inflatable hull, said inflatable wing having at least one spar movable between an extended position and a retracted position.

2. The vehicle according to claim 1, wherein said spar folds and unfolds between said positions.

3. The vehicle according to claim 1, wherein said inflatable wings deflate and fold over said inflatable hull in the retracted position.

4. The vehicle according to claim 1, wherein said inflatable wing has a leading edge spar and a trailing edge spar, both said spars constructed from a shape memory polymer.

5. The vehicle according to claim 4, wherein said shape memory polymer is heat activated by solar radiation, wherein the solar radiation moves said at least one inflatable wing to the extended position.

6. The vehicle according to claim 1, further comprising:
   a power system coupled to said inflatable hull, said power system controlling the generation and distribution of power.

7. The vehicle according to claim 6, further comprising:
   a propulsion system maintained by said power system, said propulsion system comprising a configuration/buoyancy controller and a propulsion controller, said configuration/buoyancy controller maintaining pressurization of said inflatable hull and said at least one inflatable wing, said propulsion controller maintaining directional control of the vehicle.

8. The vehicle according to claim 7, further comprising:
   at least one propeller carried by said inflatable hull, and
   a propulsion motor coupled to said at least one propeller, said propulsion controller supplying power and control signals to said propulsion motor.

9. The vehicle according to claim 8, further comprising:
   a starboard propulsion motor and a port propulsion motor, each motor connected to said propulsion controller and to a corresponding propeller.

10. The vehicle according to claim 6, further comprising:
    a photovoltaic array coupled to at least said inflatable hull and generating power supplied to said power system.

11. The vehicle according to claim 6, further comprising:
    a fuel cell carried by said inflatable hull and generating power supplied to said power system.

12. The vehicle according to claim 6, further comprising:
    a photovoltaic array coupled to at least said inflatable hull and generating power supplied to said power system; and
    a fuel cell carried by said inflatable hull and generating power supplied to said power system.

13. The vehicle according to claim 6, wherein:
    a photovoltaic array coupled to at least said inflatable hull;
    a fuel cell carried by said inflatable hull; and
    a power distribution controller connected to said photovoltaic array and said fuel cell to receive power generated from said photovoltaic array and said fuel cell.

14. The vehicle according to claim 13, further comprising:
    a propulsion system connected to said power distribution controller to receive power generated by said photovoltaic array and said fuel cell.

15. The vehicle according to claim 14, wherein said propulsion system comprises:
    a configuration/buoyancy controller and a propulsion controller, said configuration/buoyancy controller maintaining pressurization of said inflatable hull and said at least one inflatable wing, said propulsion controller maintaining directional control of the vehicle;
    a pair of propellers carried by said inflatable hull; and
    a pair of motors, each said motor connected to one of said propellers,
    said power distribution controller primarily drawing power from said photovoltaic array while exposed to sunlight and primarily drawing power from said fuel cell when not exposed to sunlight.

16. The vehicle according to claim 15, wherein said power system comprises:
    an internal power system comprising said fuel cell and further comprising a fuel generation controller receiving input from said power distribution controller;
    an electrolyzer receiving input from said fuel generation controller and said power distribution controller;
    a water storage device which supplies water to said electrolyzer, said electrolyzer separating water into hydrogen and oxygen for use by said fuel cell which generates power received by said power distribution controller and water returned to said water storage device.

17. The vehicle according to claim 16, further comprising:
a mission controller having an antenna, said mission controller receiving mission signals via said antenna and sending the same to at least said configuration/buoyancy controller.

18. The vehicle according to claim 16, further comprising:
a vapor collector coupled to said water storage device to supplement the water supply.

* * * * *